Patented July 8, 1941

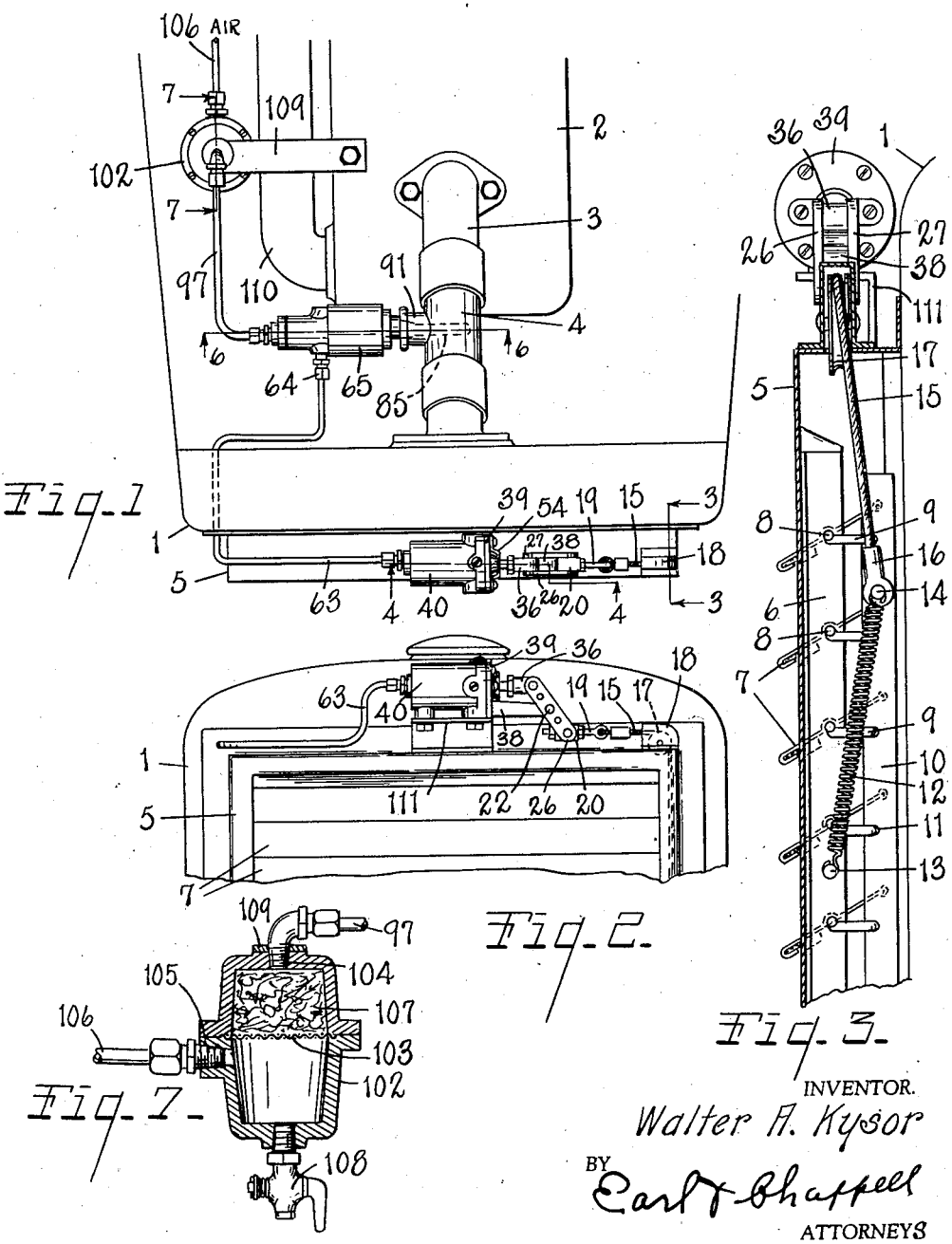

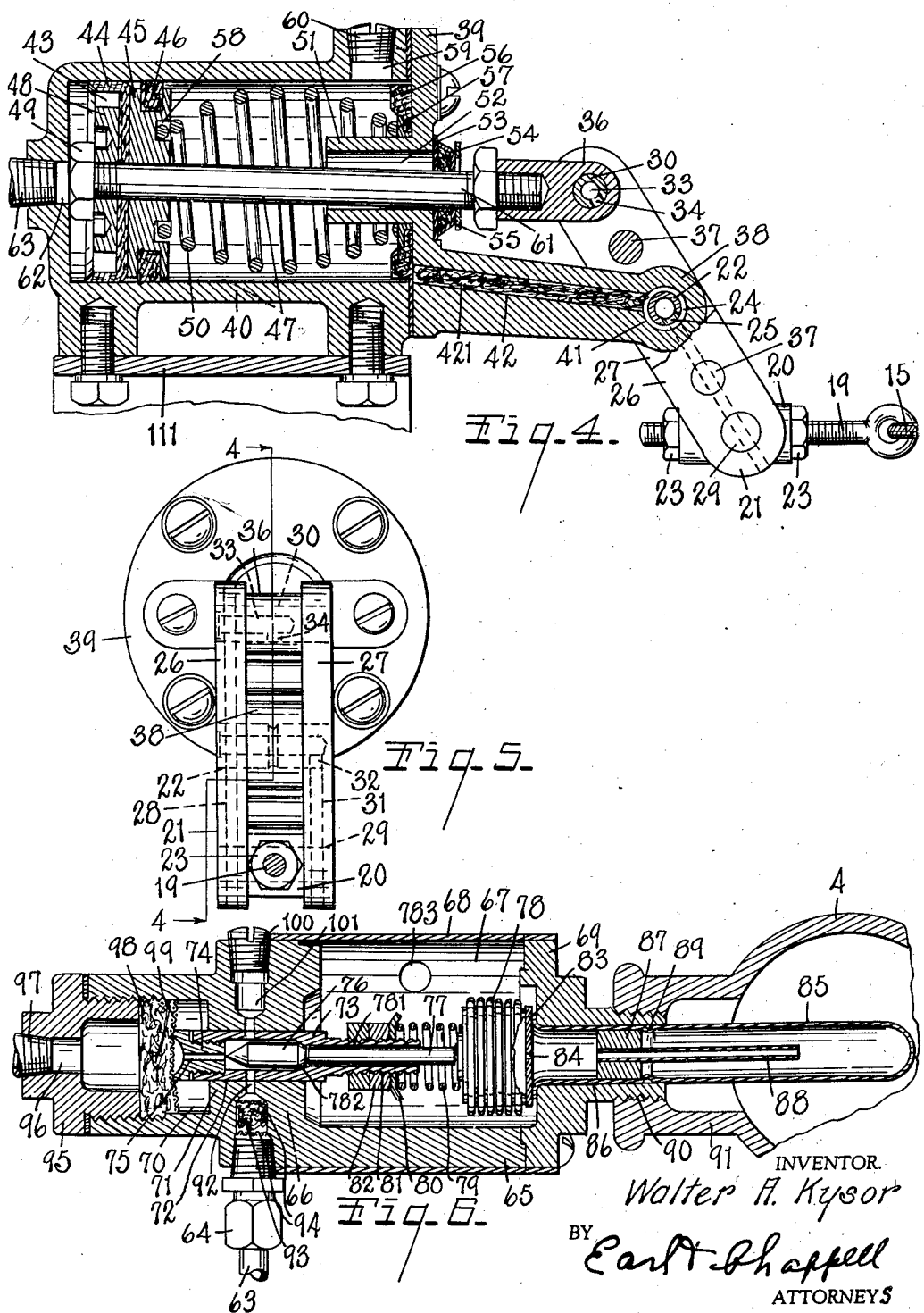

2,248,094

UNITED STATES PATENT OFFICE 2,248,094

SHUTTER MECHANISM AND THERMOSTATIC CONTROL THEREFOR

Walter A. Kysor, Cadillac, Mich.

Application February 8, 1937, Serial No. 124,674

4 Claims. (Cl. 236—35)

This invention relates to improvements in shutter mechanisms and thermostatic controls therefor.

The main objects of my invention are:

First, to provide a thermally controlled device for automatically opening and closing shutters employed in regulating the temperature of the cooling system in water cooled motor vehicles.

Second, to provide a device of the type described which is positive in action and is particularly suitable for use on motor buses and trucks.

Third, to provide a device which is simple and sturdy in construction and may be readily installed.

Fourth, to provide a device of the type described which is operable independently of the operation of the engine under all conditions encountered in vehicle operation.

Fifth, to provide a device of the type described which is self-lubricating and characterized by further provisions protecting the same from becoming inoperative because of clogging or freezing of the parts thereof under any conditions encountered.

Further objects relating to details and economies of my invention will definitely appear from the description to follow. The invention is defined in the claims.

A preferred embodiment of my invention is illustrated in the accompanying drawings, wherein:

Fig. 1 is a fragmentary top plan view illustrating the elements of my invention in operative relation to parts of a motor vehicle.

Fig. 2 is a fragmentary front elevational view illustrating the fluid motor and shutter housing of my device in operative relation on a vehicle.

Fig. 3 is an enlarged fragmentary view in vertical section on a line corresponding to line 3—3 of Fig. 1.

Fig. 4 is a fragmentary enlarged view in transverse vertical section on a line corresponding to line 4—4 of Figs. 1 and 5.

Fig. 5 is an enlarged end view partially in section looking toward the left in Fig. 4.

Fig. 6 is an enlarged fragmentary view in section on line 6—6 of Fig. 1.

Fig. 7 is an enlarged view in vertical section on line 7—7 of Fig. 1, illustrating details of the air cleaner embodied in my invention.

This invention relates to improvements in an engine cooling water heat control mechanism of the type shown, for instance, in my copending application Serial No. 26,947, filed June 17, 1935, now Patent No. 2,105,193 dated Jan. 11, 1938, and entitled Engine cooling and heating means for motor vehicles. The details of the structure herein shown and claimed are concerned solely with the operation of the radiator shutters in the system shown and claimed in that application.

The device according to my present invention is capable of automatically opening and closing the radiator shutters under thermostatic control, the shutter closing operation being accomplished positively and the shutter opening operation being achieved through spring operation so that in the event of failure of the thermostatic control means the possibility of damage to the motor parts through overheating is eliminated. Moreover, I provide fluid motor means for the specific purpose of effecting the shutter closing operation, thus relieving the thermostatic means to which the radiator temperature changes are imparted of excessive overload. In many known devices, the thermostatic element has been depended upon to effect the shutter actuation by itself, a function which imposes much too great a load on the same, with the result that it often fails.

My improved device is characterized principally by the fact that tthe shutter actuating element, which is in the form of a fluid pressure actuated engine, is positive in its action. To effect this positive operation, I drove the engine from an air reservoir under pressure, and accordingly my device is reliable in action at all times in counterdistinction to known devices which are vacuum operated, being connected to the engine manifold, and which vary in operation according to the load imposed on the engine.

Further features of my invention reside in novel air cleaning and self-lubricating details of my structure which will be more particularly described in the specification to follow.

Referring to the drawings, the reference numeral 1 indicates the radiator shell of an automobile which is communicated with the water chamber or jacket of engine block 2 by a conduit 3 which includes an insert section 4. The radiator is provided on its front with a shutter housing generally indicated at 5 and secured to the radiator shell in any suitable manner. Pivoted within the shutter housing—for instance, on vertically arranged brackets 6 therein—I provide a plurality of horizontal shutters 7 each secured to a pivot pin 8 which is journaled in brackets 6. Each of the longitudinally extending shutters preferably carries felt sealing material at its lower end adapted to cooperate in closed position of the shutter with the adjacent overlapping end of the adjacent shutter to more fully insure the housing against the admission of cold air when it is closed.

Secured to each pivot pin 8, I provide a rearwardly extending actuating lever arm 9, which arms are actuated by a vertically movable tie bar 10 provided with a plurality of apertures receiving the offset ends 11 of the several arms 9. A coil spring 12 connected at one end to a lug 13 on bracket 6 and at its other end to a lug 14 on bar 10 serves at all times to urge the bar 10 downwardly, hence the shutters toward open position.

In order to elevate tie bar 10 and shift the shutters to closed position, I employ a cable or cord 15 having a terminal eye piece 16 fastened to its free end and received by lug 14, the cable passing over a pulley 17 journaled in a small covered pulley block 18 which is secured to the upper side of the shutter housing 5. I have found this arrangement of parts to be effective, but other suitable means for shifting the shutters may be employed if desired. Also, the shutters may be arranged differently, for instance, vertically.

At its opposite end, cable 15 is connected to the eye of an adjustable screw 19 threaded in a nut 20 which is swiveled in one arm of a rock lever 21. Lever 21 is provided with a central hollow fulcrum pivot 22 for pivoting the lever in a manner to be described. Lock nuts 23 are employed to hold screw 19 in adjusted position. Pivot 22 has an annular rounded lubricating groove 24 and is radially drilled at its middle to provide a lubricant passage 25 communicating the groove with the hollow center of the pivot.

Referring to Figs. 4 and 5, it will be seen that lever 21 is made up of a pair of parallel rocker members 26, 27 movable as a unit. Member 26 has an internal lubricant passage 28 extending throughout the length thereof and communicating with the bearing surface of a hole drilled therein to receive pivot 22, as well as with the bearing surfaces for trunnion 29, for swivel nut 20, and for an upper hollow pivot 30. Member 27 has an internal passage 31 extending throughout the lower half of its length and communicating with the bearing surface for trunnion 29 and pivot 22, the latter being radially drilled at 32 in alinement with passage 31. The upper pivot 30 has an axial recess 33 and a radial passage 34 communicating with the axial recess. Pivot 30 is surrounded by a swivel element 36. Further spacing and tie members 37 are provided between rocker members 26 and 27 to connect the same for movement together.

The fulcrum or pivot 22 of lever 21 is mounted in an outwardly extending arm or post 38 integral with a cylinder head 39 enclosing one end of a plunger cylinder 40 to be hereinafter described, post 38 being provided with an opening 41 rotatably receiving the hollow pivot 22. The post is further provided with an internal elongated passage 42 which is filled with a fibrous stuffing or wick material 421 adapted to be saturated with lubricant and to permit the flow of the lubricant therethrough by capillary action.

With the above described arrangement of rock lever 21 and the lubricant passages therein, it will be seen that all of the pivot bearing surfaces are effectively lubricated, an important feature when consideration is had of the fact that the parts mentioned are in a position normally exposed to the weather. I may alter the mounting for the shutter actuating mechanism to bring the same within the hood of the automobile in any other convenient spot, but at best the parts are relatively exposed to the weather and must be protected against rusting or jamming which would cause failure of the shutter actuating mechanism as well as resist the force of spring 12, and the lubricating arrangement which I have devised admirably performs this function. The lubricant passes by capillarity through material 421 into groove 24 in the center pivot, thence through radial passage 25 internally of the pivot to longitudinal passages 28 and 31 and it flows through those passages to lubricate the bearing surfaces for all of the trunnions. Annular groove 24 makes it possible for this lubricating action to be continually in effect whether the lever 21 is moving or not.

Referring now to Fig. 4, cylinder 40 has a plunger generally indicated 43 made up of a cup leather 44 and an annularly grooved sealing disk 45 having a packing ring 46 in its groove, both of which are slidable on plunger rod 47. A cup reinforcing member 48 and a lock nut 49, both of which are threaded on the end of rod 47, complete the plunger structure. The plunger is urged to the left as viewed in Fig. 4 by a barrel-shaped coil compression spring 50. Cylinder head 39 has integral therewith a central inwardly extending hollow cylindrical guide 51 for the plunger rod 47, the opening 52 formed by the same being closed by a washer 53 and a cup 54 containing packing. The washer and cup are retained by a slotted member 55 secured to the head 39. I provide an internal ring 56 of packing material at the end of the cylinder, retained by a flanged annular element 57 against which one end of spring 50 seats. The opposite end of the spring is seated in an annular groove 58 in disk 45.

Cylinder 40 is normally partially filled with a fluid lubricant which may be inserted through a filling opening 59 closed by a threaded plug 60. The end 61 of plunger rod 47 is threadedly secured in swivel element 36 whereby movement of the plunger in an axial direction will be transmitted to lever 21 to rock the same and tension cable 15 to lift tie bar 10.

The actuation of the plunger in cylinder 40 is effected by fluid pressure, preferably air pressure, communicated with cylinder 40 through an opening 62 in the left end as viewed in Fig. 4. A tube or conduit 63 is tapped into the cylinder for this purpose.

The opposite end of tube 63 is secured to a fitting 64 tapped radially in the body of a thermostatic control device generally indicated by the reference numeral 65. (See Figs. 1 and 6.) The said device consists of a body 66 recessed to provide a chamber 67 normally closed by a removable sheet metal shield 68 surrounding the body. A centrally apertured end plate 69 closes one end of chamber 67, which may be designated as the bellows chamber of the device, and a second or intake chamber 70 is provided by a partition 71 integral with body 66 and apertured at 72 to receive a hollow cylindrical valve casing member 73 providing a valve chamber. One end of the valve chamber is closed by a valve seat 74 threaded in member 73. The valve seat is provided with a central fluid passage 75 which is adapted to be closed or opened, depending upon the heat condition of the radiator, as will be hereinafter described, by a double acting valve 76 slidable in member 73.

A plunger or thrust transmitting stem 77 extends axially through the member 73 being spaced from but adapted to contact at its ends valve 76 and a hollow expansible and contractible corrugated member or bellows 78 to transmit force from the bellows when it moves to the left as viewed in Fig. 6. The stem is spaced from member 73 by an exhaust passage 781 leading from exhaust valve seat 782 in member 73. A coil spring 79 surrounds stem 77 between the bellows and a stop washer 80 which is adjustable on the threaded end 81 of member 73 and is secured in adjusted position by lock nuts 82. Thus, by adjusting nuts 82 the pressure of spring 79 exerted on the bellows may be increased or decreased and the temperature at which the bellows operates correspondingly regulated. Inasmuch as the pressure on the liquid in the bellows is increased by an increase in spring tension, the boiling point is also raised. By decreasing spring pressure, the boiling point is lowered. By this method I may adjust the point of shutter operation anywhere from 165° to 200° and even more if desired. Irrespective of the point at which it is adjusted, the number of degrees between opening and closing operation of the shutter remains the same, approximately 7°.

At its end opposite stem 77, the bellows carries a disk 83 which I provide with a small central aperture 84 and the disk is brazed to a closed bulb 85 extending through a central opening 86 in closure member 69. Bulb 85 carries internally a partition 87 drilled to receive a small open-ended tube 88. The closed bulb is designed to contain a fluid adapted to expand and contract under thermal action whereby the expanding and contracting fluid will correspondingly expand and contract bellows 78, thus advancing and retracting valve 76 as the case may be. The partition 87 is held in fixed position by means of an annular indentation 89 formed in bulb 85.

The bulb 85 is held in conduit insert section 4 by the engagement of threads 90 on closure member 69 with an integral boss 91 on the section.

In open position of valve 76, air passage 75 in the valve seat is communicated with tube 63 through a radial port 92 drilled through valve member 73 and partition 71 in alinement with the tube. I provide a cavity 93 in advance of the tube, which is filled with a fibrous straining material and a pair of filter screens 94.

Chamber 70 is closed by an apertured plug 95 threadedly engaging in the walls of the chamber, and I tap supply tube 97 into the aperture 96 of the plug. I further dispose fibrous straining material 98 and a filter screen 99 in chamber 70 between plug 95 and valve seat 74, this provision, together with the straining material 93 and screens 94, serving to completely remove dust, moisture, or impurities from the air utilized to drive plunger 45.

A removable plug 100 threaded into partition 71 may be employed if it is desired at any time to clean out the various passages through a clean-out passage 101 in the valve member and partition 71 which is normally closed by the plug.

An exhaust vent 783 is formed in shield 68 out of which air may pass from chamber 67 when it is exhausted through passage 781 in the manner to be described.

It is necessary to leave a small amount of air along with the liquid in thermostatic bulb 85 of thermostatic control device 65, and the aperture 84 in disk 83 prevents this air from reaching the bellows and thus causing an unreliable action thereof. With the arrangement as shown, air cannot pass from the tube into the bellows.

Assuming the shutters 7 to be held open by spring 12, a drop in temperature of the engine cooling water of more than a predetermined amount causes bellows 78 to contract, allowing the valve to fall back from intake seat 74 against exhaust seat 782, thus opening passage 75 and closing passage 781. Air under pressure accordingly flows from tube 97 through passage 75, port 92, and tube 63 to cylinder 40, actuating plunger 43 to elevate the tie bar 10 and close the shutters. When the cooling water temperature passes a predetermined maximum, the bellows expands, seating valve 76 against intake seat 74, closing passage 75, and opening annular exhaust passage 781, whereupon the air under pressure in cylinder 40 is exhausted through tube 63, port 92, passage 781, and vent 783. Spring 12 then opens the shutters.

Air is supplied to control device 65 through tube 97 as stated, and reference is now directed to Figs. 1 and 7 wherein I illustrate tube 97 in communication with the upper compartment of an air filter device generally indicated 102, which device is made up of a pair of hollow castings separated into upper and lower compartments by a screen 103. The compartments have tapped openings 104, 105 receiving respectively fittings on the end of tube 97 and on the end of a tube 106 suitably connected with a reservoir of air under pressure such as is commonly found in motor buses, trucks, or coaches having pneumatic brakes. The upper compartment of the filter device 102 is filled with fibrous straining material 107 whereby air entering the lower compartment from tube 106 is initially strained of moisture and impurities prior to passing through tube 97 to control device 65. The fluid so strained drips through screen 103 to the lower compartment of the filter device and may be drained off periodically through a cock 108. Similarly, the fibrous straining material 107 and/or screen 103 may be removed and cleaned or renewed as desired.

I mount filter device 102 preferably by means of a bracket 109 secured to the cylinder head with the filter device adjacent the exhaust manifold 110 of the vehicle engine 2. Any other suitable place in the engine compartment may be chosen to provide a mounting for the filter device or it may be mounted elsewhere.

The air cylinder 40 can be, and is preferably, made of cast iron and I have illustrated the same as being bolted to a sheet metal mounting 111 carried on the shutter housing 5. However, this mounting is only illustrative and I may mount the cylinder wherever desired, as for instance, interiorly of the engine hood and on the radiator shell 1. Similarly, I find the support provided by conduit section 4 adequate to carry control device 65, but may furnish additional supporting structure therefor if it is found desirable.

My device as shown and described is effectively operable under all weather conditions and under all conditions of load imposed on the vehicle. Its operation does not fluctuate with increased or decreased engine load as in hitherto known devices. I have found that the use of a system such as I have disclosed herein results in an increase in economy of over eight per cent on a yearly basis, and furthermore, operators of vehicles equipped with the shutter actuating mechanism of my invention find it possible and desirable to leave the shutter and actuating structure on the vehicle throughout the year. The thermostatic control device of my invention may be set to operate between a range of eight to ten degrees and so adjusted will efficiently maintain a uniform temperature within those limits. The increased economy which I find to characterize vehicles embodying shutter structures according to my invention is due solely to their capability of maintaining uniformly elevated operating temperatures in the engine.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a heat control device for a vehicle cooling system, including a plurality of shutters on the radiator of the vehicle, a cylinder and fluid actuated plunger therein for closing said shutters, means for supplying fluid under pressure to said cylinder and for controlling the supply in accordance with heat requirements of the vehicle engine, comprising a fluid feed line, a control device inserted in said line and comprising a valve chamber an integral double acting valve movable in one direction in the chamber to position to shut off fluid pressure from the cylinder and exhaust fluid therefrom directly to atmospheric pressure and movable in another direction to position to close the exhaust and open the fluid supply, a bellows, a stem transmitting force between said valve and bellows, a bulb adapted for insertion in a section of the engine cooling system and containing a thermally responsive liquid, an apertured plate between said bellows and bulb to prevent entrance of air entrained in said bulb with said liquid into said bellows but permit the liquid to enter the bellows, and means for regulating said bellows.

2. In an engine heat control device, a plurality of shutters, a member operatively connected thereto, means for actuating the shutters, comprising a cylinder, and a fluid actuated plunger therein, and means for operatively connecting said means and said member and comprising a rocker lever, a hollow post mounted on said cylinder, said lever being fulcrumed on said post with the arms thereof pivotally connected to said member and said plunger respectively, said lever comprising parallel members mounted in spaced relation and having longitudinal lubricant passages therein communicating with the fulcrum and pivots, said medial pivot communicating with the interior of the post, and fibrous material in said interior extending from the cylinder to the lever fulcrum and adapted to be permeated by fluid lubricant whereby the lever is lubricated by capillarity.

3. In an engine heat control device, a shutter, a member operatively connected thereto, means for actuating the shutter, comprising a cylinder, and a fluid actuated plunger therein, and means for operatively connecting said means and said member and comprising a rocker lever, and a hollow post mounted on said cylinder, said lever being fulcrumed on said post with the arms thereof pivotally connected to said member and said plunger respectively, said lever comprising parallel members mounted in spaced relation and having longitudinal lubricant passages therein communicating with the fulcrum and pivots, said medial pivot communicating with the interior of the post, said interior extending from the cylinder to the lever fulcrum and adapted to contain fluid lubricant whereby the lever is lubricated.

4. In an engine heat control device, a shutter, means for actuating the shutter, means for operatively connecting said means and said shutter and comprising a rocker lever, a hollow pivotal support, said lever being fulcrumed on said support with the arms thereof having pivots operatively swiveled to said actuating means and said shutter respectively, said lever comprising parallel members mounted in spaced relation and having longitudinal lubricant passages therein communicating with the fulcrum and pivots, said fulcrum communicating with the interior of the support, and fibrous material in said interior adapted to be permeated by fluid lubricant whereby the lever is lubricated by capillarity.

WALTER A. KYSOR.